(12) United States Patent
Bennett

(10) Patent No.: US 8,250,054 B2
(45) Date of Patent: *Aug. 21, 2012

(54) NETWORK SEARCH ENGINE UTILIZING CLIENT BROWSER FAVORITES

(75) Inventor: James D. Bennett, Hroznetin (CZ)

(73) Assignee: Enpulz, L.L.C., Chicago, IL (US)

( * ) Notice: Subject to any disclaimer, the term of this patent is extended or adjusted under 35 U.S.C. 154(b) by 305 days.

This patent is subject to a terminal disclaimer.

(21) Appl. No.: 12/415,692

(22) Filed: Mar. 31, 2009

(65) Prior Publication Data

US 2009/0287656 A1   Nov. 19, 2009

Related U.S. Application Data

(60) Provisional application No. 61/052,878, filed on May 13, 2008.

(51) Int. Cl.
*G06F 17/30* (2006.01)
(52) U.S. Cl. ........ 707/706; 707/707; 707/709; 707/710; 707/722; 707/723
(58) Field of Classification Search ........... 707/706–752
See application file for complete search history.

(56) References Cited

U.S. PATENT DOCUMENTS

| | | | |
|---|---|---|---|
| 6,763,496 B1 * | 7/2004 | Hennings et al. | 715/205 |
| 7,573,604 B2 * | 8/2009 | Hull et al. | 358/1.8 |
| 7,593,982 B2 * | 9/2009 | Busey | 709/203 |
| 7,603,437 B2 * | 10/2009 | Busey | 709/219 |
| 7,631,255 B2 * | 12/2009 | Weise et al. | 715/229 |
| 7,827,170 B1 * | 11/2010 | Horling et al. | 707/722 |
| 2008/0215553 A1 * | 9/2008 | Badros et al. | 707/3 |
| 2009/0287657 A1 * | 11/2009 | Bennett | 707/3 |
| 2009/0287683 A1 * | 11/2009 | Bennett | 707/5 |

* cited by examiner

*Primary Examiner* — Fred I Ehichioya
*Assistant Examiner* — Tina Huynh
(74) *Attorney, Agent, or Firm* — Garlick & Markison; Bruce E. Garlick

(57) ABSTRACT

An Internet infrastructure that supports search operations that are restricted by user favorite lists, related user metadata, and user trends that are based on client-stored user favorite behavior. The Internet infrastructure contains a search engine server coupled to a plurality of web browsers resident on client devices that contain user/favorite lists and metadata. The search engine supports delivery of search result web links to the client device based upon a search string, favorite list, and related metadata. The search engine server gathers favorite lists and related metadata from the plurality of web browsers, anonymously and with user permission. The search engine server stores the gathered favorite lists and related metadata in a database that is associated with the search engine server, and delivers search results based upon the search string by putting restrictions on search results based upon stored data in the database.

21 Claims, 8 Drawing Sheets

Search Engine's Web Page (www.Search_Engine.com) 821

Enter Search String: 823 [Top Bicycle Riders 825] ⎯827

◉ Search Within Favorites    ◉ Search Using Trends    (Search) ⎯837
  829                          833

Search Results: 841

1. Www.bicycleriders.com 851
2. Mountain Drive 852
3. Tail Rider View 853
4. Bicycles for Sale 854
5. ABC.com/Bicycle 855
6. Touring with Bicycle Riders 856

Search Results Within World's Favorites: 843

1. Top Bicycle Riders [Popularity: 1] 861
2. My list of top riders [Popularity: 2] 862
3. I found top bicycle... [Popularity: 3] 863
4. I love bicycles... [Popularity: 4] 864
5. Bicycle Riding [Popularity: 5] 865
6. Bicycle Riders [Popularity: 6] 866

(Prev) ⎯885    (Next) ⎯889

Note: This Search Engine also searches within World's Favorite Lists, if chosen. Trend button allows recently added and high visit volume preferences to come to the top of the Search List. 893

Client's Browser 895

FIG. 8

NETWORK SEARCH ENGINE UTILIZING CLIENT BROWSER FAVORITES

CROSS REFERENCES TO PRIORITY APPLICATIONS

The present application claims priority under 35 U.S.C. 119(e) to U.S. Provisional Application Ser. No. 61/052,878, filed May 13, 2008, and having a common title with the present application, which is incorporated herein by reference in its entirety for all purposes.

BACKGROUND

1. Technical Field

The present invention relates generally to Internet computers/infrastructures; and, more particularly, to search engines.

2. Related Art

Search engines are common gateways to the world of Internet. Users that are unable to find what they want on the Internet often use search engines to identify a web link that is helpful. The users may search the Internet with a wide variety of interests such as business, engineering and scientific research, as well as home-based general/personal interests. Search engines usually select web links based upon a search keyword (or, search string) and rank order selected web links to the user based on relative popularity of the various web links.

Users typically have certain expectations when they are searching for web links. A user might be looking for specific information, a specific organization or company web links, etc. Often, what they get when looking for specific information or organizations are vaguely related web links containing information unrelated to their expectations.

A list of popular websites having words in web link title that are related to a user's search string or keywords often pops up at the top of the search results list. Yet, these top search results often have no relation to the information user is looking for. Pages after pages of search results can be scanned where the user gets the same unwanted search results. Often, a user has a few areas of serious interests that the user is most often searching or interested in. Unaware of user's interests, the search engine delivers web links that are vaguely associated with user's sphere of interest.

For example, a user may enter a search string 'top bicycle riders' looking for a list top ranked bicycle riders in world. The search engine is unaware of user's sphere of interest (that is, the user lives in Europe, likes bicycle racing, and that the user is looking for web sources related to top-ranked competitive bicycle riders in the world). By being unaware, the search engine delivers web links of top bicycle magazines, bicycle stores, bicycle resellers and renters, bicycle prices, bicycle touring in a remote holiday resort in the Caribbean, etc. Unable to find what he/she is looking for, the user clicks on 'next' button again and again, getting same unsatisfying results. A few pages into the list of search results, the focus of search result becomes so distant that the user abandons the search and either enters a new keyword search string or gives up on the search and seeks other alternatives, hoping to have better luck using another approach.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 8 is an exemplary schematic diagram illustrating a snap shot of a first search result page based upon a search string, favorite lists and related metadata.

DETAILED DESCRIPTION OF THE DRAWINGS

Figure 1:
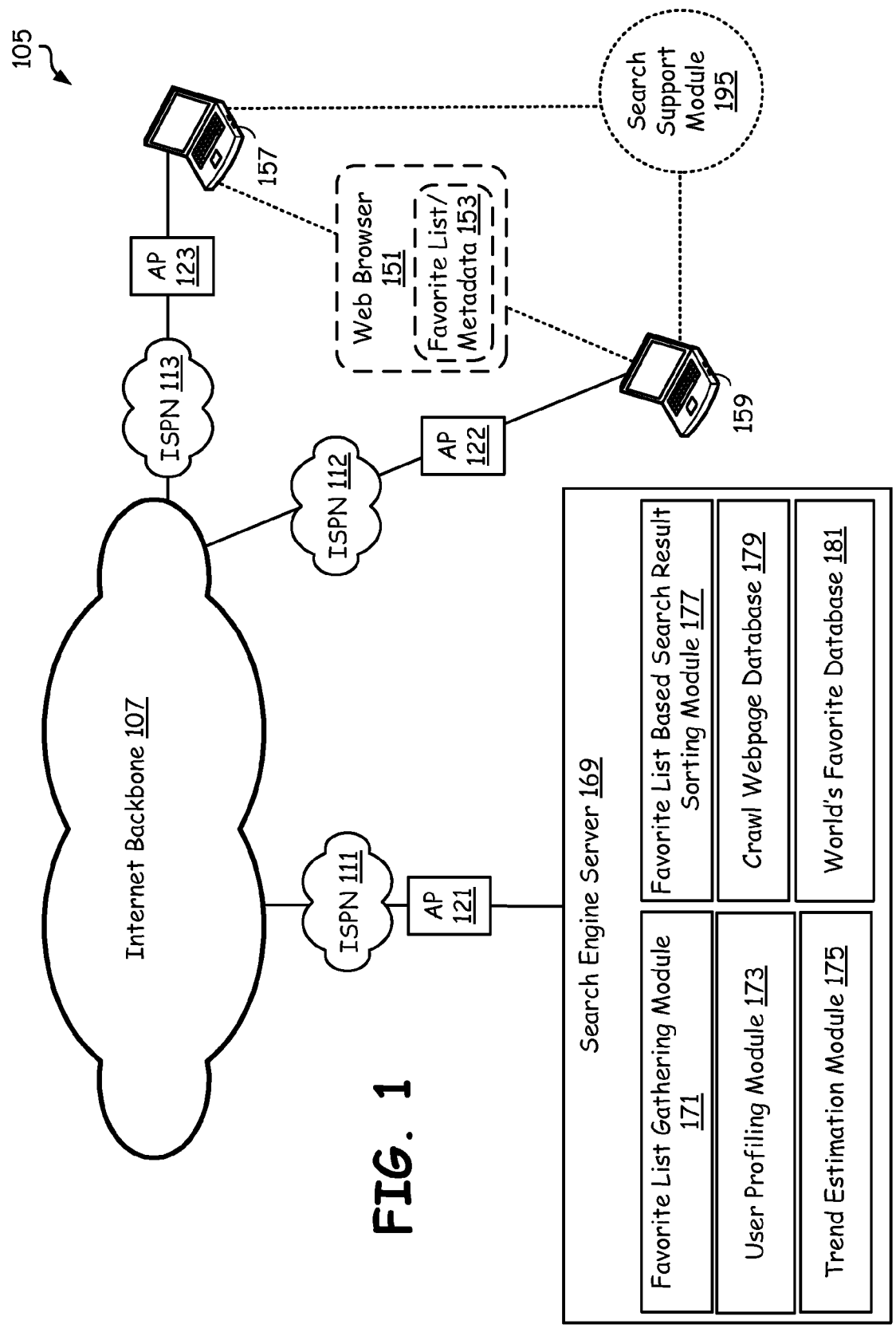
FIG. 1 is a schematic block diagram illustrating an Internet infrastructure containing a plurality of client devices and a web browser accessible search engine server, wherein the search engine server delivers web links based upon the user's favorite lists and related metadata associated with the user.

FIG. 1 is a schematic block diagram illustrating an Internet infrastructure 105. The infrastructure 105 contains a plurality of client devices 157 and 159 and at least one web browser accessible search engine server 169. The search engine server 169 delivers search result sources and/or web links based upon one or more favorite lists and sometimes also using related metadata 153 associated with the user or many users, such as user profiles, historic search patterns, computer interaction monitoring, computer location, time of day (is it work time or play time), etc. Specifically, the search engine server 169 collects the favorite lists and related metadata from web browsers 151 located on the plurality of client devices 157 thru 159, and stores the data in a world's favorite database 181. Based upon this information and a search string, the search engine server 169 reorders a resulting search result list, constructs a user profile for each of the users, and computes trends and based upon which delivers a list of web links and advertisements.

In other words, in one embodiment, the search engine server 169 collects the favorite lists and related metadata 153 from each of the plurality of client devices 157-159 during its interaction with the client device 157 or 159, processes this information appropriately, and uses this information to deliver each of the search result pages and appropriately select (or restrict) the search results and/or advertisements in accordance with the: (a) the favorite lists and related metadata 153; (b) the user search string; (c) a user profile; and/or (d) trends based upon user behavior or historic favorite selections. In another embodiment, the favorites data that is used by the search engine server or the clients to process, select, reorder, and refine the search results lists may simply be the favorites or use history of the single computer by the single user. Or, the profile and meta data used may be meta data associated with a machine, and not one particular user, as in the case of work environments or educational systems. The methods for collecting such favorite lists and related metadata 153 from the plurality of client devices 157 thru 159 can vary. One approach involves the delivery of a search interface webpage (for more details refer to the detailed description with reference to the FIG. 7) to the client. When received, the web page can be displayed as a pop-up window or some other interface, during which time the search engine server 169 requests that the user of the client device 157 or 159 allow the server 169 to upload, access, or copy their favorite lists and any applicable related metadata 153. The search string may be matched with web contents in either crawl webpage database 179 and/or just within the world's favorite database 181. The crawl webpage database 179 contains a collection or pointers to other servers/storage that collectively contain all of the web pages hosted by a plurality of web hosting servers (not shown), which are obtained during crawling from webpage to webpage.

A search result page may contain, in part or full, web links selected on the basis of: (a) matching words of search string with that of webpage contents only from world's favorite database 181; (b) matching words of search string with that of webpage contents from crawl webpage database 179; (c) the user profile; (d) trends based on the user and/or global favorite behavior; and/or (e) matching words of search string with that of webpage contents only from an advertisement database. Each of the search result list thus obtained from (a) through (e) are sorted on the basis of popularity, or some other sorting criteria. All of the web links thus selected from (a) through (e), and sorted, may be delivered separately, each of (a) through (e) in their own search result page or may be mixed together irrespective of source to form fewer search result lists and delivered in one or more columns or some other format to the user. In addition, the user may be provided with some flexibility in deciding which of the combinations of (a) through (e) is delivered in a search result page.

The favorite-list-related metadata may include various data like 'times visited', 'date added' and 'active duration of interaction with the site'. A customer profile may be developed immediately upon the server's reception of a favorite list and related metadata 153 from the web browser 151 of client device 157 or 159. The user profile may also be developed using the favorite list and related metadata 153 obtained during delivery by the search interface webpage. By using one or more favorite lists and related metadata 153, the search engine server 169 is able to further develop the user profile over time. The useful favorite list related metadata information may contain: (a) times at which web pages in the favorite lists visited; (b) time and date at which a webpage is added to the favorites list; and (c) active duration for which a webpage in the favorite lists is interacted with.

For example, a user may have most of the web links among the favorite list in the area of science, some other in the area of news and few more personal (such as mail related web sites, banking web sites) etc. In addition, the favorite list related metadata may contain information that indicates that the user mostly uses Internet for browsing between 6 pm to 8 pm, and visits science related web links 40% of the time and news related web sites 50% of the time from Monday through Friday. The search engine server 169, in this case, is able to construct a user profile that includes all of the user browsing behavior as related to the favorite list and related metadata 153, such as: (a) User's Area of Interests: Science, News and Personal; (b) Visiting Hours for Science: 6 pm to 8 pm, Most Viewed Web Site: 'CXY.com', Percentage of Time Dedicated to 'CXY.com': 30% etc. From this user profile, the search engine server 169 may determine that if the search string received during a search is related to the area of science, the user is likely to be interested in many of the science related web links associated with their profile, and the server will deliver web links or search results based on that assumption, either separately or mixed with other lists/sources mentioned above. In other cases, the useful favorite list will contain more complex statistics or specific content preferences of the user (i.e., the user often visits medical sites, visits CNN.com 80% of the time, likes YouTube, etc.). It may even contain user profile info provided by the user, like the user is a PhD in physics, has two teenage children, is married, drives a BMW, lives in Germany, and likes to travel on business.

The various data and trends that are revealed using favorite data/monitoring/tracking/behavior allows the search engine server 169 not just to find better search result content, but allows the server or client to better reorder the search result list, based upon, for example, recently added search interests and high-visit volume preferences. In fact, certain profile or meta data, like the most visited sites, the most viewed content, the most recent interests, etc., can be weighed higher that other data in the meta data or user profile files. In essence, the search engine server 169 may push some of these recently added and highly-visited web links or content areas to the top of the list. In addition, the search engine server 169 processes the data stored in the world's favorite database 181 to determine search hit probability with favorite weighting factors (a modified natural language search). The favorite weighting factor is determined based upon a number of users tagging a webpage as favorite or may be set on another one or more other parameters, like volume of hits to a site and/or amount of time spent per user on the site (i.e., stickiness of the site). That is, the search engine server 169 may determine some subjective or objective popularity of each of the web pages within the world's favorite database 181 and assign a favorite weighting factor to it to filter more 'popular' sites higher in the search result or web site lists provided to the user. When a search string is received from the web browser 151 of a client device 157 or 159, the search engine server 169 reorders search results based upon the favorite weighting factor.

The Internet infrastructure 105 illustrated in FIG. 1 contains the search engine server 169 communicatively coupled to the plurality of client devices 157 thru 159/ The clients are coupled to the server 169 via access points (APs) 121, 122 and 123, various ISPNs (Internet Service Provider's Networks) 111, 112, and 113, and an Internet backbone 107. Other network configurations are possible. The client devices 157 thru 159 contain search support modules 195 that assist in providing popup or windowpane as an interface that allows user to submit favorite lists to the search engine server 169. In FIG. 1, the web browser 151, metadata 153, and module 195 are shown singularly in the figure, however, each client device most likely has its own copy of metadata, browser, and modules, albeit they may be identical or similar in some cases to the same data/programs stored on other clients.

The search engine server 169 contains a favorite list gathering module 171 that collects various favorite lists and related metadata 153 and stores this data in the world's favorite database 181. When search engine server 169 begins interaction with the web browser 151 on one or more clients, such as when the search interface webpage (that contains options to upload favorite list and related metadata 153 to the search engine server 169) is delivered, the search support module 195 interacts with the user. Then, upon clicking of a 'send favorite list' button by the user, the favorite list gathering module 171 receives the requisite favorite list(s) and related metadata 153 (if any), processes it as needed, and stores it in world's favorite database 181 for further processing during search operations. A user profiling module 173 creates a user profile as mentioned in above paragraphs soon after the favorite list gathering module 171 receives the favorite lists and related metadata 153. A trend estimation module 175 retrieves stored information from the world's favorite database 181 and processes it to create or identify certain Internet trends such as recently added websites and high visit volume preferences. A favorite list based search result sorting module 177 orders web links, selected on the basis of the search string, by popularity or some other criteria before the search result lists or list of web pages is provided our for display on a client device. This module 177 may also reorder the web links selected from crawl webpage database 179 based upon information processed from world's favorite database 181 or other favorite lists or user profiles.

The search interface webpage that is delivered to the user as a first page upon the first search request from the web browser 151 will facilitate the user to: (a) search within world's favorite database 181 alone; (b) search within crawl webpage database 179 alone; (c) search in both (or more) of these sources; (d) search based upon trends based on favorite behavior alone; and/or (e) any of the combinations of (a) through (e). Thus, the user may search only within the world's favorites by providing a search string, or the user may search within both database 179 and within world's favorites 181 (in which case, at least two search result columns of web links are often delivered, one for each). In other operations, the user may allow incorporation of trend-based web links within the search results so that the Internet or user-specific trends are favored when determining and/or ordering search results for presentation to the user. In addition, a 'send favorite list' button allows either a windowpane or a popup window to appear, containing the web browser's favorite lists. The user is able to remove, edit, or add web links to the list before sending them to the search engine server 169 or otherwise authorizing them for server access or copying. The user is also provided with a helpful tip (sometimes legally required) that lets the user know the use and privacy terms with which the favorite list and related metadata 153 is gathered by the search server engine 169. For example, the helpful tip may be "To help us improve our site can you please provide your favorite list? You may edit, include, or delete any web link from the favorite list before sending it to us. We do not invade your privacy; keep records of any of your data including IP address and name."

As an example, a user may enter 'top bicycle riders' as a search string and choose the 'search within favorites' option to search for web links associated with various statistically significant favorite lists around the world. Also, the user may edit or delete web links within the favorite list and click on 'send favorite list and search'. Then, the search engine server 169 searches for web links only within the world's favorite database 181 and delivers search results in one or more of the columns. Another column may have results derived from the crawl webpage database 179. Still another column may have advertisements tailored by using a customer profile, derived from one or more of the favorite list of the user, user metadata, user profiles on the client, user usage patterns, etc.

It is important to note that FIG. 1 illustrates only two client machines and one server for each of illustration, whereas most networks, intranet, and Internet contain thousands, millions, and maybe even billions of computers, clients, devices, and servers. And, client devices need not be personal computers (PCs), desktops, or laptops. The client devices can be personal digital assistants (PDAs), cell phones, smart phones, iPods, industrial equipment, automotive embedded controllers, digital TV processors, set top boxes, satellites, appliances, or any other kind of network device that connects to a network.

Figure 2:
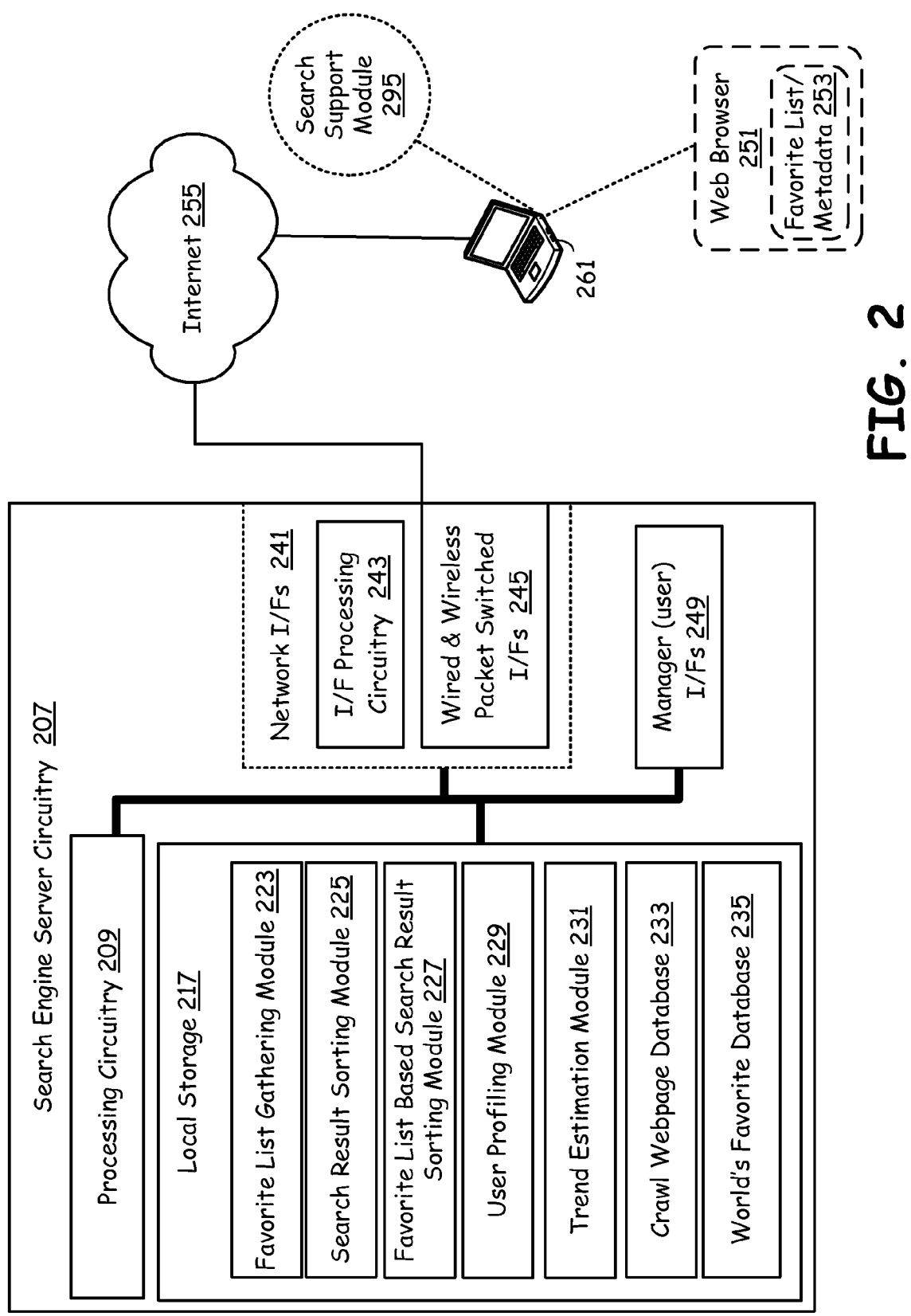
FIG. 2 is a schematic block diagram illustrating components of the search engine server constructed in accordance with the embodiment of FIG. 1.

FIG. 2 is a schematic block diagram illustrating components of the search engine server constructed in accordance with the embodiment of FIG. 1. The search engine server circuitry 207 may be, in part or in full, incorporated into any computing device that is capable of serving as an Internet based server. The search engine server circuitry 207 generally includes processing circuitry 209, local storage 217, manager interfaces 249, and network interfaces 241. These components are communicatively coupled to one another via one or more of a system bus, dedicated communication pathways, or other direct or indirect communication pathways. The processing circuitry 209 may be, in various embodiments, a microprocessor, central processing unit (CPU), a digital signal processor, a graphics processor, a state machine, an application specific integrated circuit, a field programming gate array, combinations thereof, or other processing circuitry.

The network interfaces 241 contain wired, optical, and/or wireless packet switched interfaces 245 and may also contain built-in or an independent interface processing circuitry 243 (another CPU or like device dedicated to processing input/output information from the circuitry 207). The network interfaces 241 allow the search engine server 207 to communicate with client devices such as 261 and to deliver search result pages containing search result web links. The manager interfaces 249 may include one or more display and keypad interfaces. These manager interfaces 249 allow the user or an IT expert at the search engine server 207 to control aspects of the server system. The client device 261 illustrated (only one client device is illustrated for ease of illustration) is communicatively coupled to the search engine server 207 via the Internet 255. In other embodiments, the Internet 255 may be replaced with an intranet, a local area network, a wide area network, a wireless connection, a proprietary network, or other networks.

Local storage 217 may be any type of random access memory (RAM), read-only memory (ROM), flash memory, electrically erasable memory, optical storage, magnetic storage, a disk drive or array, an optical drive, any combination thereof, or another type of memory that is operable to store computer instructions and data. The local storage 217 includes a favorite list gathering module 223, search result sorting module 225, favorite list based search result sorting module 227, user profiling module 229, trend estimation module 231, crawl webpage database 233, and a world's favorite database 235 to facilitate a user's search, in accordance with the embodiments taught herein.

The favorite list-gathering module 223 in FIG. 2 gathers favorite lists and related metadata 253 from web browsers, such as browser 251 or from other users or user devices, and stores this data in the world's favorite database 235. The gathering of favorite list and related metadata 253 from a plurality of global or wide area sources occurs during search engine server's 207 interaction with the many web browsers 251 out over the Internet that are associated with the client devices like client device 261. For example, a search interface webpage may contain options to upload the local favorite list and related metadata 253 to the search engine server 207 when prompted or periodically, and provide the user an option to edit, delete, protect, deny, and/or send, in whole or in part, the favorite list and related metadata 253. Once received, the favorite list gathering module 223 stores the favorite list and related metadata 253 in the world's favorite database 235 along with other users favorite list information and may compile global data/statistics related thereto for further processing.

The favorite list gathering module 223, once the favorite list and related metadata 253 is received, forwards data to the user profiling module 229, or the module 229 may independently query for data over the Internet on a different cycle than the database 235. The user-profiling module 229 then creates a user profile from data received from the user or client device 261. By using the user's favorite list related metadata 253 or other local data associated with the user, the search engine server 207 is be able to develop a user profile by using: (a) the times at which web pages in the favorite lists visited; (b) the time and date at which a webpage is added to the favorites list; (c) the active duration for which a webpage in the favorite lists is interacted with, (d) the type of content desired; (e) the geographic preferences of the content; (f) language limitations of the content, and/or other related metadata. The trend estimation module 231 retrieves stored information from the world's favorite database 235 and processes it to create trends such as recently-added websites and high visit volume preferences and other possible statistics related to favorite data over many users or sources. The favorite list based search result sorting module 227 orders search result web links based on popularity or some other criteria. The search result web links are selected based on certain correlations to the search string and/or user profiles/favorites/metadata, by popularity. The search result-sorting module 225 may reorder the web links selected from the crawl webpage database 233 based upon information processed from world's favorite database 181 or other local or global favorites information.

In other embodiments, the search engine server 207 of FIG. 2 may include fewer or more components than are illustrated as well as lesser or further functionality. In other words, the illustrated search engine server is meant to merely offer one example of possible functionality and construction in accordance with the present invention.

Figure 3:
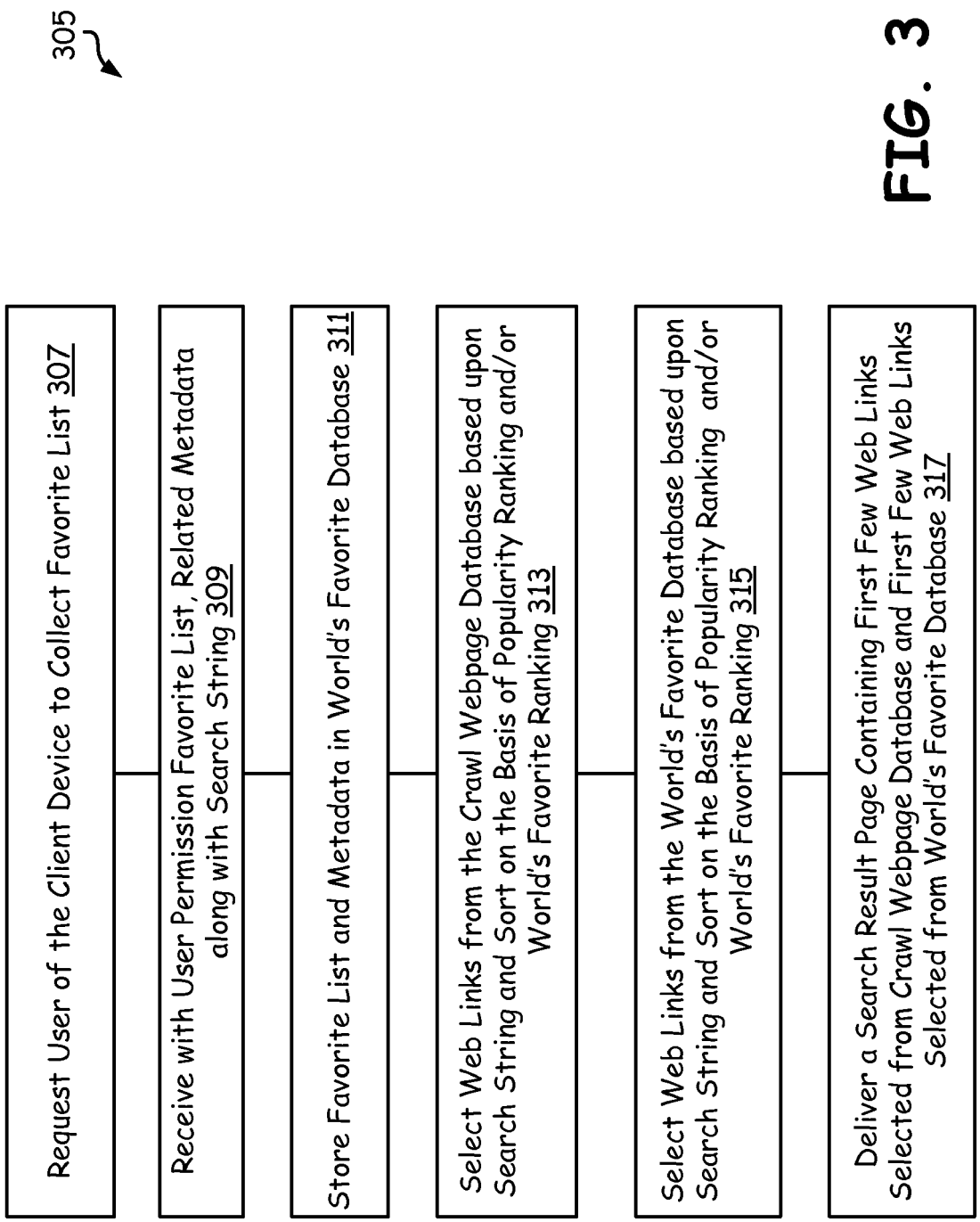
FIG. 3 is a flow diagram illustrating functionality of the search engine server of FIG. 1.

FIG. 3 is a flow diagram illustrating functionality of the search engine server of FIG. 1. The functionality 305 begins at a block/step 307, where the search engine server requests that the user of the client device provide favorite list and/or meta data to the server. This part of the functionality may occur during any previous and/or current interaction of the search engine server with the web browser of the client device, specifically, during delivery of search interface web pages for various searches. In one embodiment, the search interface webpage is the first webpage that is delivered to the web browser to initiate a new search. In the search interface webpage, the search engine server provides an option to upload the user's favorite list(s) on to an editable window pane or popup window and allows the user to edit, remove, deselect, protect, etc., various info therein, and then send the appropriate favorite list information along with a search string to the server. In other embodiments, the favorite lists may already have been collected and be current with the user already, whereby the step of collecting favorites can be skipped, unless favorite data is new on the client device or stale/purged at the server side.

At a next block/step 309, the search engine server receives, with optional user permission, the favorite list and related metadata, along with the user search string (if a new search is to be initiated). At a next block/step 311, the search engine server stores the favorite list and any related data or metadata in a world's favorite database and also constructs user profiles using the collected information from the client device or other user sources. To construct a user profile, the search engine server uses favorite list, client data, use patterns, user input, user data, and the related client metadata such as, for example: (a) percentages of categories of web links; (b) the times at which web pages in the favorite lists visited; (c) the time and date at which a webpage is added to the favorites list; and/or (d) the active duration for which a webpage in the favorite lists is interacted with, among other related metadata. In addition, before delivery of a search result page, the search engine server processes stored data in the world's favorite database to create trends and other statistics or useful information, such as recently added websites, websites that are visited for a long time or are "sticky", and high visit volume preferences for the user. The user may choose to search, using a new search string or the same search string, within the world's favorite database, within the crawl webpage database, and/or search using trends in an attempt to find search result information to suit user needs.

At a next block/step 313, the search engine server selects web links from the crawl webpage database based upon the search string and sorts them on the basis of popularity ranking and/or world's favorite ranking. The world's favorite ranking may be decided by using favorite weighting factors that determines how many users select a webpage as their favorite. At a next block/step 315, the search engine server selects web links from the world's favorite database that are based upon or correlate to the search string, and the step 315 sorts these web links on the basis of popularity ranking and/or world's favorite ranking for an ordered presentation to a user. The process of block/step 315 is performed only if the user chooses to search within the world's favorite database. At a final block 317, the search engine server delivers a first search result page containing one or more of: (a) web links from world's favorite database; (b) web links from crawl webpage database; (c) web links based upon user profile (may be advertisements); and/or (d) web links based upon trends (based on favorite behavior). In another embodiment similar in scope to FIG. 3, the search result list presented to the user may be selected by processing at least three of the following sources of data: user profile data, user historic search patterns, user-client interaction data, client location, the time of day, the search string, user metadata, and user favorites data.

Figure 4:
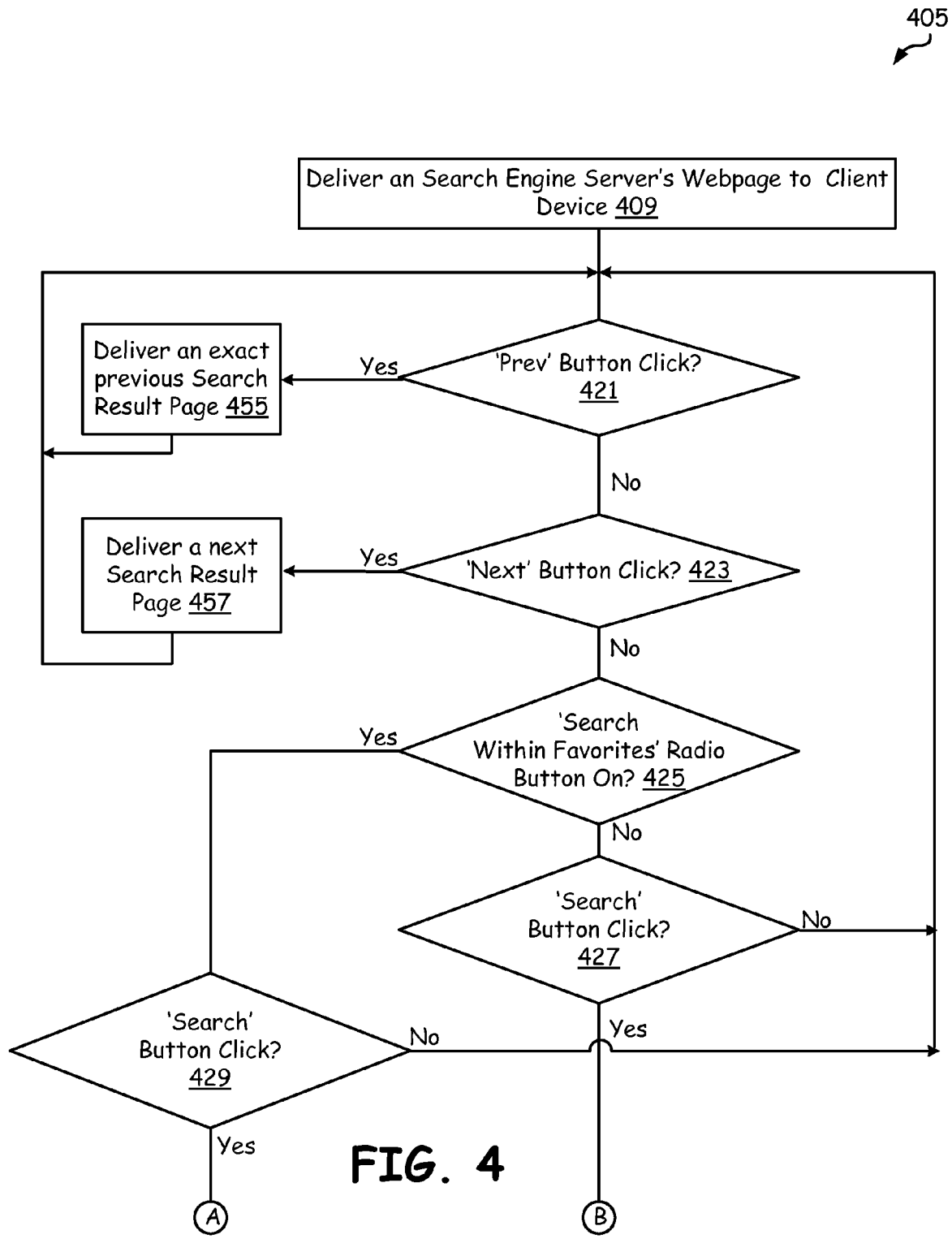
FIGS. 4-5 illustrate a flow diagram showing the functionality of the search engine server of FIG. 1 upon delivering a search engine server's webpage, in one embodiment.

FIG. 4 is a flow diagram illustrating the functionality of the search engine server of FIG. 1, upon delivering a search engine server's web page to the client device in one embodiment. The functionality 405 of the search engine server, in this embodiment, begins at a block/step 409, where a search interface webpage (refer to FIG. 7 for detailed description of a typical search interface webpage) or subsequent search engine server's webpage is delivered. The search interface webpage may initiate a new search, and using a new search string typically allows the user to enter and process a search string and upload favorite list and related metadata. Similarly, the subsequent search result pages (search engine server's webpage) contain provisions to enter a new or modified search string, as well as 'next' button and 'prev' (or 'previous') button to cycle through pages of search results.

At a next decision block/step 421, the search engine server determines if 'prev' button is clicked. If yes, at a next block/step 455, the search engine server delivers an exact previous search result page, and then waits for new inputs from the user of the client device. In case of the search interface webpage, the 'prev' button is often not available as there is no previous data to go back to. If 'prev' button is not clicked at the decision block/step 421, then, at a next decision block/step 423, the search engine server determines if 'next' button is clicked. If yes, at a next block/step 457, the search engine server delivers a subsequent search result page and waits for new inputs from the user of the client device. In case of the search interface webpage, the 'next' button is often not available as there may be no search results that are compiled and presented to the client device at this time. It is also important to note that the order of decision boxes in FIG. 4 may be changed in order and priority.

If 'next' button is not clicked at the decision block/step 423, then, at a next decision block/step 425, the search engine server determines if the 'search within favorites' radio button is on. If not, the search engine server determines, at a next decision block/step 427, if 'search' button is clicked. If yes at the decision block/step 427, then the search engine server begins the search processing for a new search criteria, based upon a search string via connector 'B' (refer to the FIG. 5 for continuation of the method flow) to process search results without using favorites processing. If 'search within favorites' radio button is clicked at the decision block/step 425, then, at a next decision block/step 429, the search engine server determines if 'search' button is clicked. If yes at the decision block/step 429, then the search engine server begins processing of a new search criteria using favorites data to refine search results based upon a search string and favorites via connector 'A' (refer to the FIG. 5 for continuation of the method steps).

Figure 5:
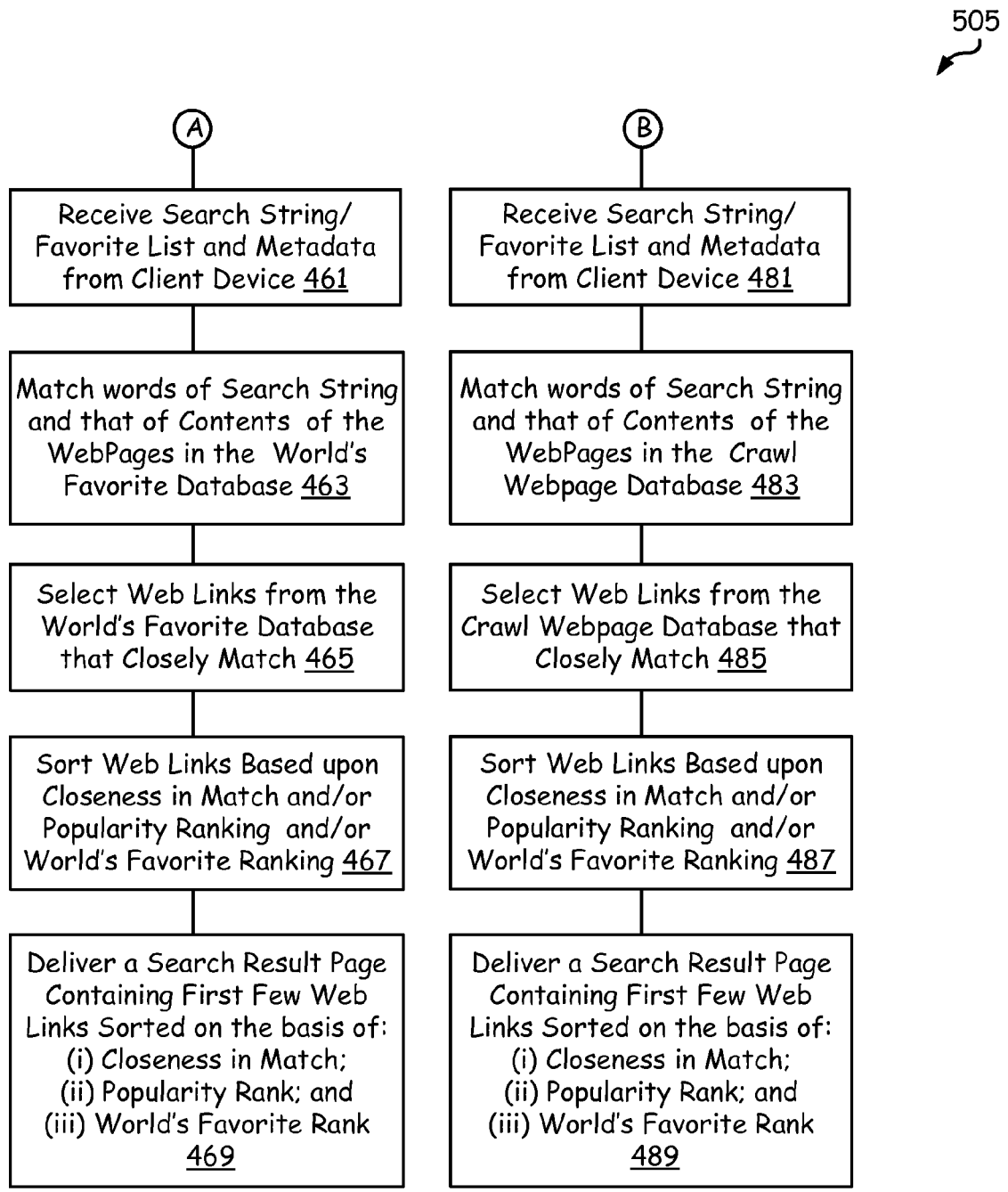

FIG. 5 is a flow diagram illustrating functionality of the search engine server of FIG. 1, continued from two connectors A and B of FIG. 4. The continued functionality 505 of FIG. 4 via connectors 'A' begins at a block 461 with the search engine server receiving a search string along with favorite list and metadata from client device's web browser. At a next block/step 463, the search engine server matches words of the search string with that of contents of the web pages in the world's favorite database. Then, at a next block/step 465, the search engine server selects web links from the world's favorite database, on the basis of closeness in search string match. At a next block/step 467, the search engine server sorts the selected web links based upon closeness in match and/or popularity and/or world's favorite ranking. The world's favorite ranking is decided based upon favorite weighting factor that determines how many users select a webpage as their favorite. At a next block/step 469, the search engine server delivers a search result page containing a first few web links sorted on the basis of: (a) closeness in match; (b) popularity rank; and/or (c) world's favorite rank. These combinations may be displayed separately in multiple columns or in a single column.

The continued functionality 505 of FIG. 4 via connector 'B' begins at a block/step 481 with the search engine server receiving a search string along with optional favorite list and metadata from client device's web browser. The favorite list and metadata may be optional in these steps, as this processing of steps 481-489 may not need any favorites data or metadata to process. At a next block/step 483, the search engine server matches words of the search string with that of contents of the web pages in the crawl webpage database (not the favorites web page database). Then, at a next block/step 485, the search engine server selects web links from the crawl webpage database, on the basis of closeness in match to the search string or other user search criteria or data. At a next block/step 487, the search engine server sorts the selected web links based upon closeness in match and/or Internet popularity or some other criteria. At a next block/step 489, the search engine server delivers a search result page containing a first few web links sorted on the basis of: (a) closeness in match; (b) popularity rank; and/or (c) world's favorite rank. These combinations may be displayed separately in multiple columns or in a single column.

Note that the functionality of 'search using trends' and also that of user specifically sending or electing, in whole or in part, not to send the favorite list and metadata to the search engine server are not specifically illustrated in method of FIGS. 4 and 5, as these concepts are taught elsewhere herein. But in other embodiments, such functionality is clearly shown via the snap shot of FIG. 7, as well as other variations/embodiments herein (such as displaying mixing of search results from various databases), all of which are possible.

Figure 6:
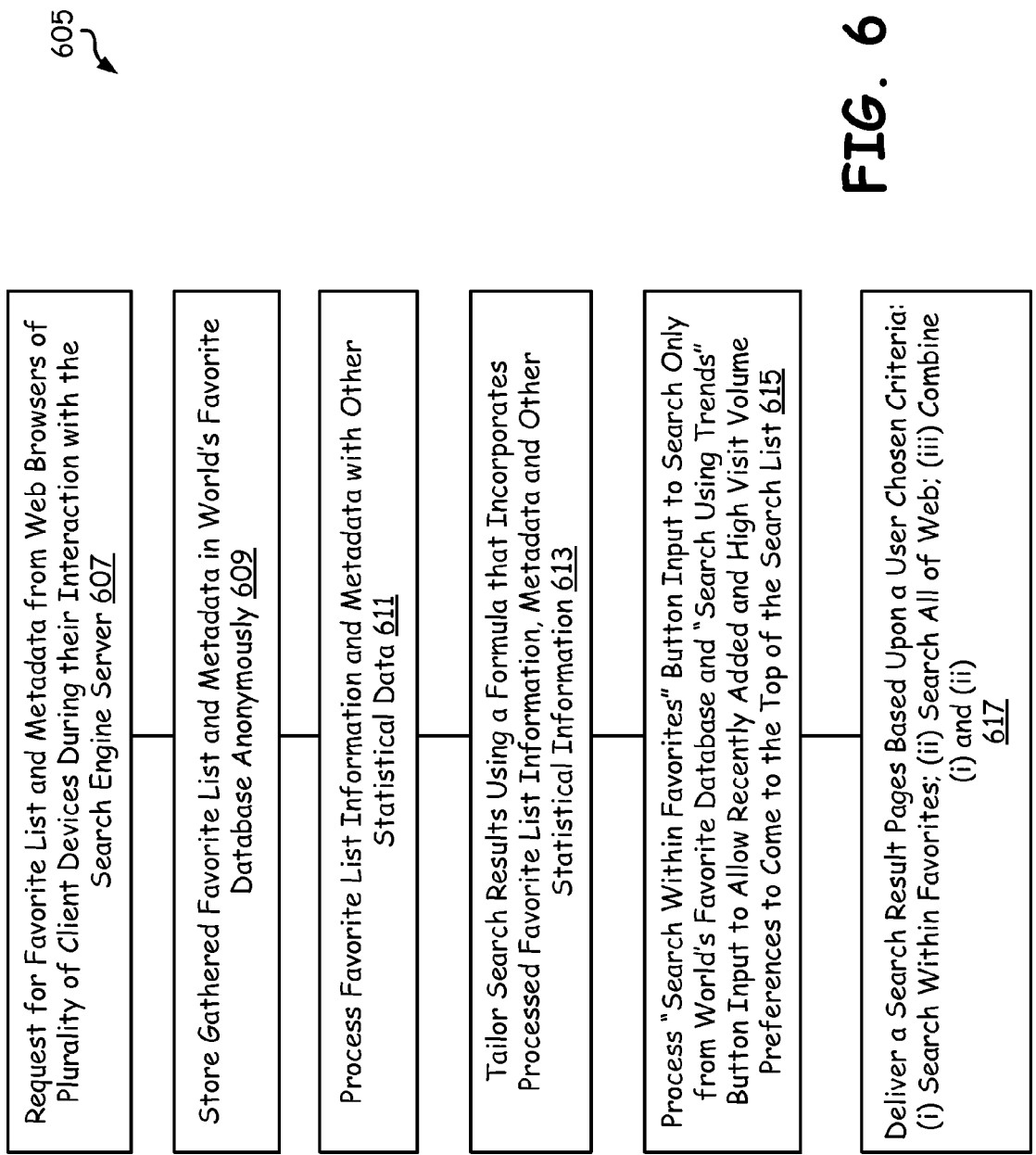
FIG. 6 is a flow diagram illustrating the functionality of the search engine server of FIG. 1 wherein the search engine server gathers and processes favorite lists and related metadata, and delivers web links based upon this data.

FIG. 6 is a flow diagram illustrating the functionality of the search engine server of FIG. 1, wherein the search engine server gathers and processes favorite lists and related metadata and delivers search result web links based upon this data. The functionality 605 of gathering and processing favorite lists and related metadata to restrict and modify search result lists begins at a block/step 607, where the search engine server requests favorite list(s) and related metadata from web browsers on a plurality of client devices during their interaction with the search engine server. The search engine server may request delivery or access to the favorite lists and related metadata during delivery of any search engine server's web page, on any interval or event, on a specific triggered occasion for collecting such favorite list(s) and related metadata from the plurality of client devices, or some other method that may or may not include delivery of a search interface webpage (refer to the description of FIG. 7). During the delivery of a search interface web page the search engine server requests that the user of the client device provide to the server their favorite list(s) and/or related metadata. The search interface webpage contains a window pane or provides a popup window that is loaded with the user's favorite lists and allows the user to add, edit, remove, delete, protect, and send certain portions of the favorite lists along with a search string to start a search operation. Also, in other embodiment, the interface, timing, and method of processing, providing, and updating favorite lists and metadata can be completely different from the process for inputting search strings and obtaining search result information.

Then, at a next block/step 609, the search engine server stores gathered favorite list or lists and related metadata in a world's favorite database in an anonymous manner in a preferred embodiment. If anonymous, the user is informed during collecting of the favorite list and related metadata that the collection is anonymous and no private data such as IP address and name(s) are collected. At a next block/step 611, the search engine server processes the favorite list and related data with other statistical data. One of the processes is that of creating a user profile from the recently collected favorite list and related metadata, where the user profile is used to reorder the search result list and possibly reorder, select, or reprioritize advertisements to cater to the needs of the user. Another of the processing steps is that of identifying user trends or creating trends data based upon the user's favorite(s) access/use/behavior. These trends may be used to reorder the search result list and provide more targeted or relevant advertisements for the user(s). At a next block/step 613, the search engine server tailors search results using a formula (that gives certain weight to each of the factors that influence reordering of the search result list, such as user profile, search within favorites, and search-using trends) that incorporates processed favorite list and related metadata and other statistical information derived therefrom or separate therefrom.

At a next block/step 615, the search engine server processes "Search Within Favorites" button input (if turned on) to search only from world's favorite database and "Search Using Trends" button input (if turned on) to allow recently added and high visit volume preferences to come to the top of the search result list. This processing occurs immediately after collecting favorite list and related metadata, and the processing includes selection and sorting from the world's favorite database alone and/or sorting on the basis of trends. At a next block/step 617 and for one embodiment, the search engine server delivers a search result page based upon a user chosen criteria for each of the search string, favorite list, and related metadata received from the plurality of web browsers. Specifically, The search engine server delivers a search result page based upon a user chosen criteria, which includes: (a) search within favorites; (b) search all of the web; (c) combinations of (a) and (b).

Figure 7:
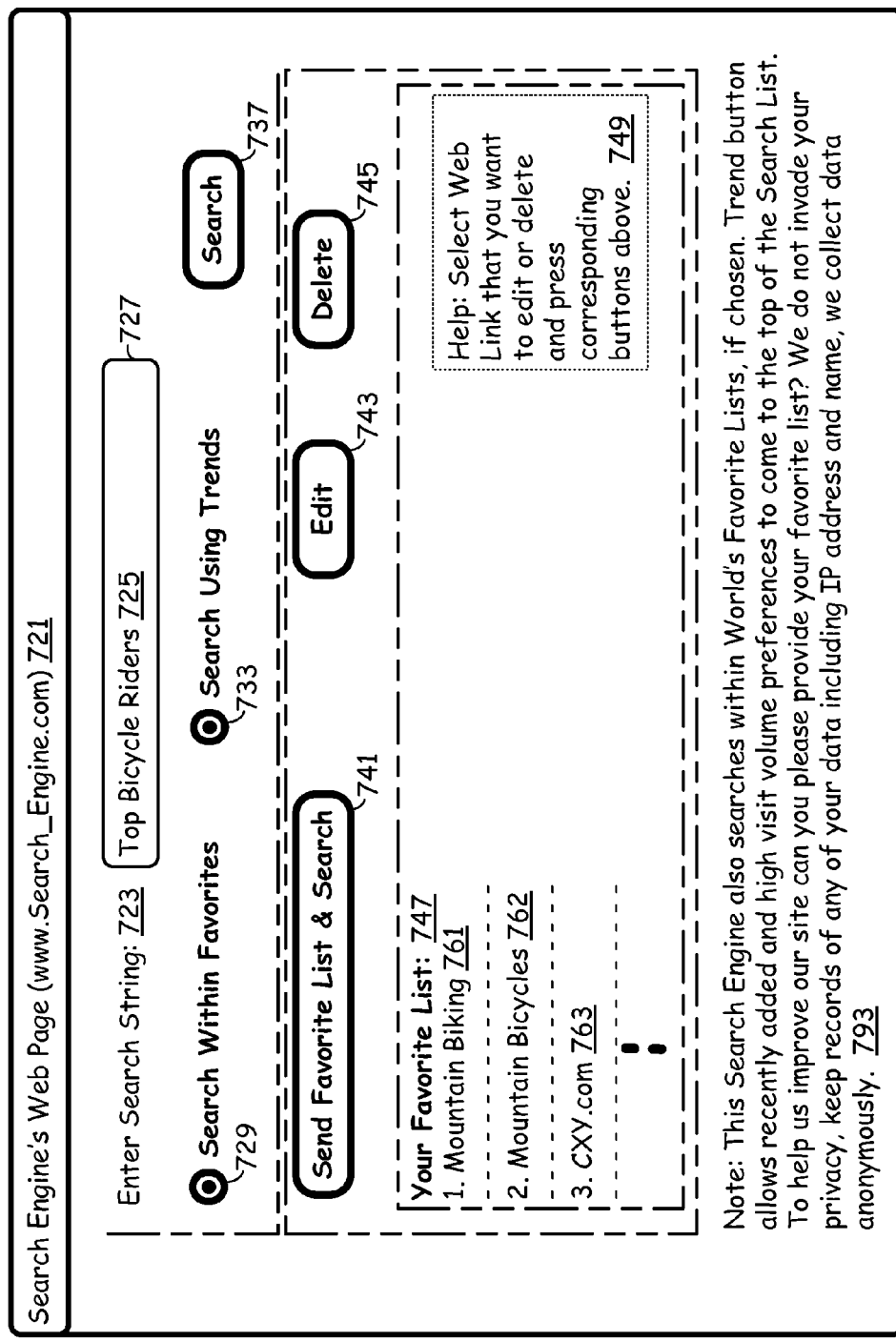
FIG. 7 is an exemplary schematic diagram illustrating snap shot of search interface webpage of the search engine server of FIG. 1, wherein the search interface webpage allows user to send favorite list and related metadata, and provides user options to search within favorites and user search trends.

FIG. 7 is an exemplary schematic diagram illustrating s snap shot of s search interface web page 705 of the search engine server of FIG. 1, wherein the search interface webpage 705 allows a user to send a favorite list and related metadata to the server and provides user options to search within certain favorites, and wherein the system can search using trends. Specifically, the exemplary snap shot illustrated shows the search engine server's search interface webpage 705 delivered to web browser 795 of the client device to facilitate user's search and to send favorite list and related metadata. The search engine server's search interface webpage 705 may contain a page title such as 'Search Engine's web page (www.Search_Engine.com)' 721, and a 'search' button 737. Along with 'search' button 737, the search interface webpage 705 also contains 'search within favorites' option 729 and 'search using trends' option 733 via radio buttons or some other input mechanism that help restrict the search, in accordance with the embodiments taught herein. The user is able to restrict a search to only within world's favorite database and/or search using trends based upon favorite behavior by using these radio buttons 729 and 733. In addition, a text message, such as 'Enter Search String:' 723 and text box 727 are provided to facilitate user search input and operations. The user may enter the search string in the text box 727, such as the text 'Top Bicycle Riders' 725, make appropriate choices on the interface 705 and click on the 'search' button 737 to initiate a new or refined search.

An additional favorite list windowpane is provided for the user to send favorite list and related metadata. The windowpane that is illustrated in FIG. 7 may also be offered in a popup window, in another embodiment. The windowpane loads up favorite list data from the web browser automatically, as illustrated in FIG. 7. For example, the windowpane may contain a title such as "Your Favorite List" 747, followed by a list of web links or favorite data, such as 761 through 763. The windowpane also has button to edit and delete, 'Edit' 743 and 'Delete' 745 and possible select other operations for the feedback data that is presented. In another embodiment, a fully functional word processing type interface may be provided to the user in window 747. Using the buttons 743 and 745, etc., the user can add additional web links or favorites data to the list, delete certain web links from the list, edit some of the links, etc. Also, a 'Send Favorite List and Search' 741 button allows the user to send favorite list and initiate a new search (based on the search string in the text box 727) at the same time as updating favorite information and metadata. A helping text tip within the window pane (such as "Help: Select Web Link that you want to edit or delete and press corresponding buttons above" 749) may be provided to help user to understand how to edit and send favorite list and related metadata and how this data may be used by the system.

In addition, a helpful note may be provided in FIG. 7, such as:

"Note: This Search Engine also searches within World's Favorite Lists, if chosen. Trend button allows recently added and high visit volume preferences to come to the top of the Search List. To help us improve our site can you please provide your favorite list? We do not invade your privacy, keep records of any of your data including IP address and name, and we collect data anonymously"

The note 793 helps a user to understand that the data is collected anonymously to facilitate a better search, in cases where the privacy policy supports anonymity.

FIG. 8 is an exemplary schematic diagram illustrating a snap shot of a first search result page 805 that is provided based upon a search performed using a search string, favorite lists and related metadata as taught herein. Specifically, the exemplary snap shot illustrated in FIG. 8 shows the first search result page 805 delivered to the web browser 895 of a client device to facilitate user search operations. The first search result page 805 may contain a page title such as 'Search Engine's web page (www.Search_Engine.com)' 821, and a 'search' button 837. The first search result page 805 also contains a 'search within favorites' radio button 829 and a 'search using trends' radio button 833 that help restrict/refine the search. The user is able to restrict a search to only within world's favorite database and/or a search using trends that are derived based upon user favorite behavior via these radio buttons 829 and 833. A text such as 'Enter Search String:' 823 and text box 827 are provided to facilitate user search input and interfacing. The user may enter the search string in the text box 827, such as 'Top Bicycle Riders' 825, make appropriate choices of options in FIG. 8 and click on 'search' button 837 to initiate a new search. The first search result page 805 also contains the 'prev' button 885 and 'next' button 889 to access prior displayed search result pages and any subsequent search result pages, respectively. In addition, a helpful note such as note 893 can be displayed on the monitor/screen of a client device and help the user to obtain search information like the following text:

"Note: This Search Engine also searches within World's Favorite Lists, if chosen. Trend button allows recently added and high visit volume preferences to come to the top of the Search List"

Also, the first search result page 805 may contain, in various columns and window panes, search result web links selected on the basis of: (a) matching words of search string with that of webpage contents only from world's favorite database; (b) matching words of search string with that of webpage contents from crawl webpage database; (c) user profile data; (d) trends based on favorite(s) behavior/data; and/or (e) matching words of search string with that of webpage contents only from an advertisement database. All of the web links selected in this manner to form columns or sections (a) through (e) in the display window may be delivered separately in each search result page or may be mixed in some manner to form fewer lists of web links that can be delivered in fewer columns. The first search result page 805 illustrated in the exemplary snap shot of FIG. 8 shows two columns, namely, 'Search Results' 841 and 'Search Results Within World's Favorites' 843, each containing search result web links selected on the basis of search string 'Top Bicycle Riders' 825 from crawl webpage database and world's favorite database, respectively. The two columns illustrated in FIG. 8 show web links numbered 1 through 6 as web links 851 through 856 and web links 861 through 866, as organized in the columns 'Search Results' 841 and 'Search Results Within World's Favorites' 843, respectively.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips (e.g., a multi-core device). Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may or may not modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks, and method steps, and order of these blocks/steps, have been arbitrarily defined herein for convenience of description. Alternate boundaries, orders, and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as any requisite or significant functions of a specific embodiment are appropriately performed in some manner by some structure/method. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein can be implemented as illustrated by discrete components, application specific integrated circuits, processors executing appropriate software, software modules, and the like, or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A computing device implementing a network search engine, the computing device comprising:
processing circuitry;
network communication circuitry coupled to the processing circuitry, the network communication circuitry configured to receive, from a communications network:
a use history associated with a particular machine implementing a browser, wherein the use history associated with a particular machine includes metadata associated with a single machine used by multiple different users;
a user favorites data that identifies favorite preferences for a user;
a search string;
the processing circuitry configured to:
select a source for finding search results to define at least one selected source;
derive a search result list by searching data within the at least one selected source, wherein search results in the search result list correlate appropriately with the use history associated with a particular machine, the user favorites data and the search string;
order the search result list to place more relevant search results higher in a rank order of the search result list; and
deliver, via the network communication circuitry, a search result page containing data from the search result list for eventual use by the user.

2. The computing device of claim 1, wherein:
the processing circuitry is further configured to derive a plurality of search results lists, each of the plurality of search results lists derived by searching data within a different database; and
wherein search results in each search result list are selected based on at least the user favorite data and the search string.

3. The computing device of claim 2, wherein the search results in each search result list are selected based on the user favorite data, the use history associated with a particular machine, and the search string.

4. The computing device of claim 1, wherein:
the processing circuitry is configured to generate a first search results list including search results obtained from a first selected source;
the network communication circuitry is configured to deliver the first search result list for presentation to the user;
the processing circuitry is further configured to generate, in response to user input, a second search results list including search results obtained from a second selected source; and
the network communication circuitry is further configured to deliver the second search result list for presentation to the user.

5. The computing device of claim 1, wherein the processing circuitry is configured to define the search results list by performing a search based on the user favorites data from this user, and a user favorites data from a plurality of other users.

6. The computing device of claim 1, wherein:
the processing circuitry is configured to select a plurality of different sources to be searched separately and used to derive separate search result lists; and
the network communication circuitry is configured to deliver the separate search result lists for display to a user of the particular machine.

7. The computing device of claim 1, wherein:
the network communication circuitry is configured to receive user input leaving a search string used for an initial search unchanged, but changing the at least one selected source to be searched; and the processing circuitry is configured to repeat the initial search using the same search string, but in different sources as indicated by the user input.

8. The computing device of claim 1, wherein:
the network communication circuitry is configured to monitor user interaction with search results during a search session;
during the same search session, adjusting the user profile to generate an adjusted user profile; and
performing a modified search using the adjusted user profile during the same search session.

9. A device comprising processing circuitry configured to implement a search engine server, the search engine server adapted to support delivery of search result pages of web links to a web browser of a client device, the device configured to implement:
a favorite list-gathering module configured to:
obtain historical favorite list data and related metadata from a plurality of different web browsers located on a plurality of different client devices and associated with a plurality of different users;
store the favorite list data and metadata in a favorite database, wherein the favorite list data and metadata stored in the favorite database includes links to favorite webpages from each of the plurality of different web browsers;
a user profiling module configured to use the favorite list data and metadata from at least one user to determine:
at least one area of interest associated with the at least one user;
user browsing behavior associated with the at least one user;
a trend estimation module configured to:
determine user-accessed web pages and high-visit-volume preferences recently added to the favorite database;
select web links from the favorite database to form a trend-based search result list;
a favorite list based search result sorting module configured to:
receive a search string;
interface with the favorite list-gathering module to construct a user profile from the favorite list, related metadata, and search string;
select web links from a plurality of search result databases to generate a user-profile-based search result list; and
the device further including network communication circuitry that provides, as output from the search engine server, at least the trend-based search result list and the user-profile based search result list.

10. The search engine server of claim 9, wherein:
the user profiling module is configured to receive user input indicating that a search string used for an initial search is to be left unchanged, and that at least one source that was searched during the initial search is to be changed; and
the search engine server is configured to repeat the initial search using a source different from the source that was searched during the initial search.

11. The search engine server of claim 9, wherein:
the search engine server interacts with the plurality of different web browsers; and
historical favorite list data associated with a first user of a first web browser is used to alter search results for a search string submitted by a second user of a second web browser.

12. The search engine server of claim 9, wherein:
the favorite list based search result sorting module is configured to sort the favorite list based search result in addition to selecting web links to be included in the user-profile based search result list.

13. The search engine server of claim 9, wherein the favorite list based search result is configured to select web links from both a crawl webpage database and a world's favorite database.

14. The search engine server of claim 9, wherein the user favorites data only from this user is processed, stored, and used to sort search results obtained from a database including web links associated with favorites of a plurality of users.

15. The search engine server of claim 9, wherein:
the search engine server derives a plurality of search results lists, each of the plurality of search results lists derived by searching data within a different database; and
the network communications circuitry is configured to deliver the plurality of search results list for concurrent display on a single web browser.

16. A method that is performed by a search engine server that supports delivery of search result web links based upon a search string and favorites lists, the method comprising:
receiving favorite lists and related user metadata from a plurality of web browsers during their interaction with the search engine server;
storing the favorite lists and related metadata in a database to create stored data;
processing stored data in the database to determine user profiles and user search trends;
receiving a favorites list and a search string from a user, wherein the favorites list and the search string are received concurrently;
using the search engine server, selecting search results from the same database that stores the favorite lists and related metadata, the search results selected based on the search string, the favorites list, user profiles and trends, to define selected search results;
ordering the selected search results based on the user profiles and trends; and
delivering ordered search result pages based upon the search string, user profiles, and trends external to the search engine server.

17. The method of claim 16, further comprising:
using the search engine server to select search results from a crawl webpage database in addition to selecting search results from the database that stores the favorite lists and related metadata.

18. The method of claim 16, further comprising:
selecting search results based on metadata associated with a particular web browser.

19. The method of claim 16, further comprising:
receiving user input indicating that a search string used in and initial search of a first source is to be use to perform a second search of a source different from the first source.

20. The method of claim 16, further comprising:
delivering a plurality of search result lists to a web browser for concurrent display, wherein each of the plurality of search result lists is derived by searching different sources using the same search string.

21. The method of claim 20, wherein a first search result list includes web links from a crawl webpage database, and a second search result list includes web links from a world's favorite database.

* * * * *